(12) United States Patent
Lucarelli

(10) Patent No.: US 9,296,454 B1
(45) Date of Patent: Mar. 29, 2016

(54) VEGETATION CUTTER FOR TROLLING MOTOR AND TROLLING MOTOR WITH INTEGRAL CUTTER

(71) Applicant: Stephen Lucarelli, Meredith, NH (US)

(72) Inventor: Stephen Lucarelli, Meredith, NH (US)

( * ) Notice: Subject to any disclaimer, the term of this patent is extended or adjusted under 35 U.S.C. 154(b) by 0 days.

(21) Appl. No.: 14/614,033

(22) Filed: Feb. 4, 2015

(51) Int. Cl.
| | |
|---|---|
| *B63H 23/24* | (2006.01) |
| *B63H 5/16* | (2006.01) |
| *B63H 20/00* | (2006.01) |
| *A01D 34/835* | (2006.01) |

(52) U.S. Cl.
CPC .............. *B63H 5/165* (2013.01); *A01D 34/835* (2013.01); *B63H 20/007* (2013.01)

(58) Field of Classification Search
CPC ................................ B63H 20/007; B63H 23/24
USPC ........................................................ 440/6, 73
See application file for complete search history.

(56) References Cited

U.S. PATENT DOCUMENTS

| | | | | |
|---|---|---|---|---|
| 726,180 | A * | 4/1903 | Miller ..................... | B63H 5/165 440/73 |
| 732,568 | A * | 6/1903 | Lee ......................... | B63H 5/165 416/146 R |
| 1,390,397 | A * | 9/1921 | Svenson ................. | B63H 5/165 415/121.1 |
| 4,080,099 | A * | 3/1978 | Snyder ..................... | B63H 1/26 416/146 R |
| 4,447,215 | A * | 5/1984 | Govan ................... | B63H 5/165 416/146 R |
| 4,450,670 | A * | 5/1984 | Robinson ............... | B63H 5/165 416/146 R |
| 4,609,361 | A * | 9/1986 | Sumino .................. | B63H 5/165 416/146 R |
| 4,676,758 | A * | 6/1987 | Dennis ................... | B63H 5/165 416/146 A |
| 4,911,664 | A * | 3/1990 | Gremillion .......... | B63H 20/007 416/146 R |
| 6,113,445 | A * | 9/2000 | Trosclair ................ | B63H 5/165 416/146 R |
| 6,478,639 | B1 * | 11/2002 | Covell, III ............. | B63H 5/125 114/347 |
| 7,425,162 | B2 * | 9/2008 | Caulfield ............... | B63H 5/165 440/73 |
| 8,007,329 | B2 * | 8/2011 | Wengren, Jr. .......... | B63H 11/01 440/46 |
| 8,974,260 | B1 * | 3/2015 | Davidson ............... | B63H 5/165 440/73 |

\* cited by examiner

*Primary Examiner* — Lars A Olson
*Assistant Examiner* — Jovon Hayes
(74) *Attorney, Agent, or Firm* — Michael J. Persson; Catherine E. Napjus; Lawson-Persson & Weldon-Francke

(57) ABSTRACT

A vegetation cutter attachment system for a trolling motor to aid in cutting water weeds and grass that wrap around the propeller or motor housing of the trolling motor during use. The attachment system includes a plate affixable to the motor housing and conformed to the motor housing's shape and at least one corner with a cutting surface.

20 Claims, 7 Drawing Sheets

VEGETATION CUTTER FOR TROLLING MOTOR AND TROLLING MOTOR WITH INTEGRAL CUTTER

FIELD OF THE INVENTION

The present invention is, generally, an improvement on trolling motors, and specifically, a vegetation cutter for a trolling motor to cut away vegetation, such as grass, weeds and other aquatic vegetation, and trolling motors with an integral vegetation cutter.

BACKGROUND

A trolling motor is a self-contained unit that includes an electric motor, propeller and controls, and is affixed to a boat, either at the bow or stern. Trolling motors are often used by anglers, such as bass fishermen, who want their boat to slowly move around an area, or to maintain their position, while they cast their lures. A trolling motor is usually a secondary means of propulsion mounted on the transom alongside the watercraft's primary outboard motor. However, a trolling motor may be the primary source of propulsion for smaller watercraft, such as canoes and kayaks, and on lakes where the use of a gasoline-powered engine is prohibited.

FIG. 1 illustrates a prior art clamp mounted trolling motor that is adapted for removably mounting to a watercraft. The motor 10 is attached to a propeller 12 by propeller shaft (See Ref. 70 in FIG. 3C) which extends from the back portion of the motor housing 24. A skeg 14, which is a rudder or fin for the motor 10, extends from the bottom of the motor housing 24 and a shaft 16 extends from the top of the motor housing 24. A clamp 18 is provided for clamping the assembly onto the watercraft and for adjusting the position of the shaft 16. At the top of the shaft 16 is the tiller 20 and controls 22 for steering and operating the assembly, respectively. Other trolling motors are adapted for permanent mounting on the bow of a watercraft, such as a bass boat. These motors replace the clamp 18 of the motor 10 of FIG. 1 with a mounting assembly and often include a foot pedal that allows the motor to be controlled by the user's foot. One of ordinary skill in the art will recognize that many variations may be made on this basic design for a trolling motor and the present invention should not be seen as being limited to any specific style of trolling motor.

All trolling motor users are familiar with the perpetual problem of grasses, weeds, lily pads, or other aquatic vegetation, getting wound around the propeller or shaft of trolling motors. Following this, in the best of scenarios, the trolling motor loses efficiency. If this vegetation gets too wound around the propeller, it becomes necessary to stop the motor, remove it from the water, and remove the vegetation. Not only is this a nuisance, but as the propeller and/or skeg may be sharp, the user is in danger of cutting himself during the removal process. In addition, damage may be caused to the seals around the propeller shaft, which keep water from coming into contact with the electric motor, thus necessitating major repair of the trolling motor. In other circumstances, the stuck vegetation may cause the propeller to stop rotating completely; sometimes called "shorting" the trolling motor. Such a short may cause temporary or permanent damage to the motor. In addition, if the trolling motor is the watercraft's primary outboard motor, then the trolling motor user is stuck in place. If the trolling motor is the watercraft's secondary outboard motor, the user may be forced to use the primary gasoline-powered motor, which will likely end his fishing for the day, and may be illegal, depending on where he is. Therefore there is a need to prevent the buildup of aquatic vegetation around the propeller of trolling motors.

This need was the object of U.S. Pat. No. 4,911,664 to Gremillion. This invention discloses a weed cutting and shredding attachment for an electric trolling motor including a sharpened cutting blade oriented with the sharp edge thereof adjacent to the path of the movement of the leading edge of the propeller blades on an electric trolling motor together with a mounting structure for effectively mounting the cutting element from the trolling motor. The attachment includes a cutting element or blade, provided with a bracket structure for detachably and removably securing the attachment to the trolling motor.

Although this invention discloses one manner in which to address the problem, this device had several drawbacks that prevented it from being commercially successful. First, this attachment extended outward from the skeg and forward of the intersection between the propeller and the motor housing, which renders it ineffective at cutting vegetation that has wrapped itself around the rear portion of the propeller. Second, because its sharp blade extends outward from the skeg, it creates a serious safety hazard. Third, the design requires that the device be mechanically fastened to the skeg, preferably by drilling and tapping a hole in the skeg and screwing it in place. This drilling and tapping is undesirable. It often causes the motor's warranty to be voided and, should the mechanical fastener loosen, it can contact the propeller, causing damage and, potentially shorting. In addition, as the mechanical fastener loosens, it renders the device ineffective and prone to loss. Fourth, as the attachment protrudes out and down between the propeller and skeg, the cutting element may simply end up being another protrusion around which vegetation may wind, which is especially true as the cutting element dulls. Finally, the device is not adapted for manufacturing as part of the motor itself, which relegates the device to the aftermarket. Therefore, there is ample room for improvement over this invention.

Another attempt to address the problem of the winding vegetation is to add a sharpened blade, such as a metal blade, to the skeg of the trolling motor, so that the skeg is extended to be quite close to the propeller, and also sharpened. Although this model may have some success, it also has its drawbacks. First, it will affect the watercraft's steering by making the rudder effectively larger. The person steering the watercraft will have to accommodate himself to the change, as smaller moves may result in larger changes in direction. In addition, the attachment, which is usually secured with screws through the skeg will make the skeg less fluidly dynamic, again affecting the steering of the watercraft. Moreover, the sharp edge is a serious safety hazard and, as the sharp edge of the skeg attachment dulls, the attachment will only serve to decrease the space between the skeg and the propeller so that there is less space for vegetation to travel naturally therethrough, thus creating greater and more severe blockages.

Therefore, there is a need a device that is effective at cutting vegetation that has wrapped itself around the rear portion of the propeller, that does not extend outward from the skeg, that does not creates a serious safety hazard, that does not need be mechanically fastened to the skeg, that will not cause the motor's warranty to be voided, that will not be prone to contacting the propeller, that is not prone to loss, that may be integrated into the motor housing, and that will not result in the cutting element being another protrusion around which vegetation may wind.

SUMMARY OF THE INVENTION

The present invention is an attachment system for a trolling motor and a trolling motor including the attachment of the present invention.

The attachment system of the present invention is for use with any standard trolling motor, such as that shown in FIG. 1 and described above. The attachment system includes a plate, which includes a bottom surface that may be affixed to the motor housing of the trolling motor, and a means for affixing the plate to the motor housing. The preferred means of affixation is with epoxy, and the plate preferably includes one or more holes through the plate through which the epoxy is capable of flowing for better adhesion. However, mechanical means, such as screws, clamps or the like may also be sued. The plate has a right side and a left side and at least one corner with a cutting surface.

In some embodiments, both corners on a side may include cutting surfaces, or an entire side may include a cutting surface. In still others, the cutting surface is a removable cutting surface that is attached to the plate by a screw or other mechanical means and may be replaced when dull.

The plate is curved and contoured to conform to the shape of the motor housing. All motor housings are cylindrical, so the preferred plate for use with a standard motor housing is also rounded for flush affixation of the plate to the round motor housing. The preferred plate is rectangular when flattened meaning that, were the curve eliminated, the plate would be form a rectangular prism. The preferred plate has a width of between 2.25 and 2.75", preferably approximately 2.5"; a length of between 1.5 and 2", preferably approximately 1.75"; and a height of between $1/16$ and $3/16$", preferably $1/8$". The plate includes a motor housing side that will be flush against the motor housing when installed, and a top surface that will face away from the motor housing when installed. The cutting surface slopes downward through the height so that the thickest part of the cutting surface is proximate to the top surface and the thinnest part of the cutting surface is proximate to the motor housing side.

The plate is preferably made of aluminum, which is preferred due to the fact that it is non-magnetic and will not interfere with the operation of the motor, as well as its corrosion resistance. However, other materials, such as plastics or composites may provide similar properties, and ferrous metals, such as steels, may be used provided the motor housing provides adequate magnetic shielding.

The trolling motor of the present invention is a trolling motor commonly used in the art with the vegetation cutter attachment either affixed to the motor housing of the trolling motor using the attachment means, as discussed above, or with the cutting surface formed integral to the housing of the trolling motor. In embodiments in which the vegetation cutter attachment is affixed to the motor housing, the plate is attached to the cylindrical back portion of the motor housing of the trolling motor proximate to said propeller such that the cutting surface is exposed and positioned to cut said vegetation from said propeller. In embodiments in which the cutter is formed integral to the housing, the motor housing includes an extension that may either be sharpened or allow for mounting of a sharpened blade thereto.

It is preferred that the plate be disposed away from the skeg and between the propeller and the shaft, preferably at a ninety degree position between the top and the skeg. When the trolling motor is in operation, the movement of the propeller will create a spiral slipstream that moves around the motor housing. The spiral slipstream will move water and vegetation around the motor housing in this direction as well. The direction of the spiral slipstream "engages" the left side of the plate, including the left propeller facing corner. That is to say that the spiral slipstream will move over that left side, including the left propeller facing corner from the bottom of the plate to the top of the plate. On the right side of the plate, the spiral slipstream will "glide" over the right side and its corners, meaning the spiral slipstream will move over the side from the top of the plate to the bottom of the plate. The engagement of spiral slipstream with the left side of plate, and especially the left propeller facing corner, will bring vegetation, such as weeds, grass, and fishing line, across the left side and its left propeller facing corner. When the vegetation moves across the left propeller facing corner with the cutting surface, the vegetation will be cut before it has a chance to wind around the trolling motor.

Therefore, it is an aspect of the invention to provide a vegetation cutter device that is effective at cutting vegetation that has wrapped itself around the rear portion of the propeller.

It is a further aspect of the invention to provide a vegetation cutter device that does not extend outward from the skeg.

It is a further aspect of the invention to provide a vegetation cutter device that does not creates a serious safety hazard.

It is a further aspect of the invention to provide a vegetation cutter device that does not need be mechanically fastened to the skeg.

It is a further aspect of the invention to provide a vegetation cutter device that will not cause the motor's warranty to be voided.

It is a further aspect of the invention to provide a vegetation cutter device that will not be prone to contacting the propeller.

It is a further aspect of the invention to provide a vegetation cutter device that is not prone to loss.

It is a further aspect of the invention to provide a vegetation cutter device that may be integrated into the motor housing.

It is a still further aspect of the invention to provide a vegetation cutter device that will not result in the cutting element being another protrusion around which vegetation may wind.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1:
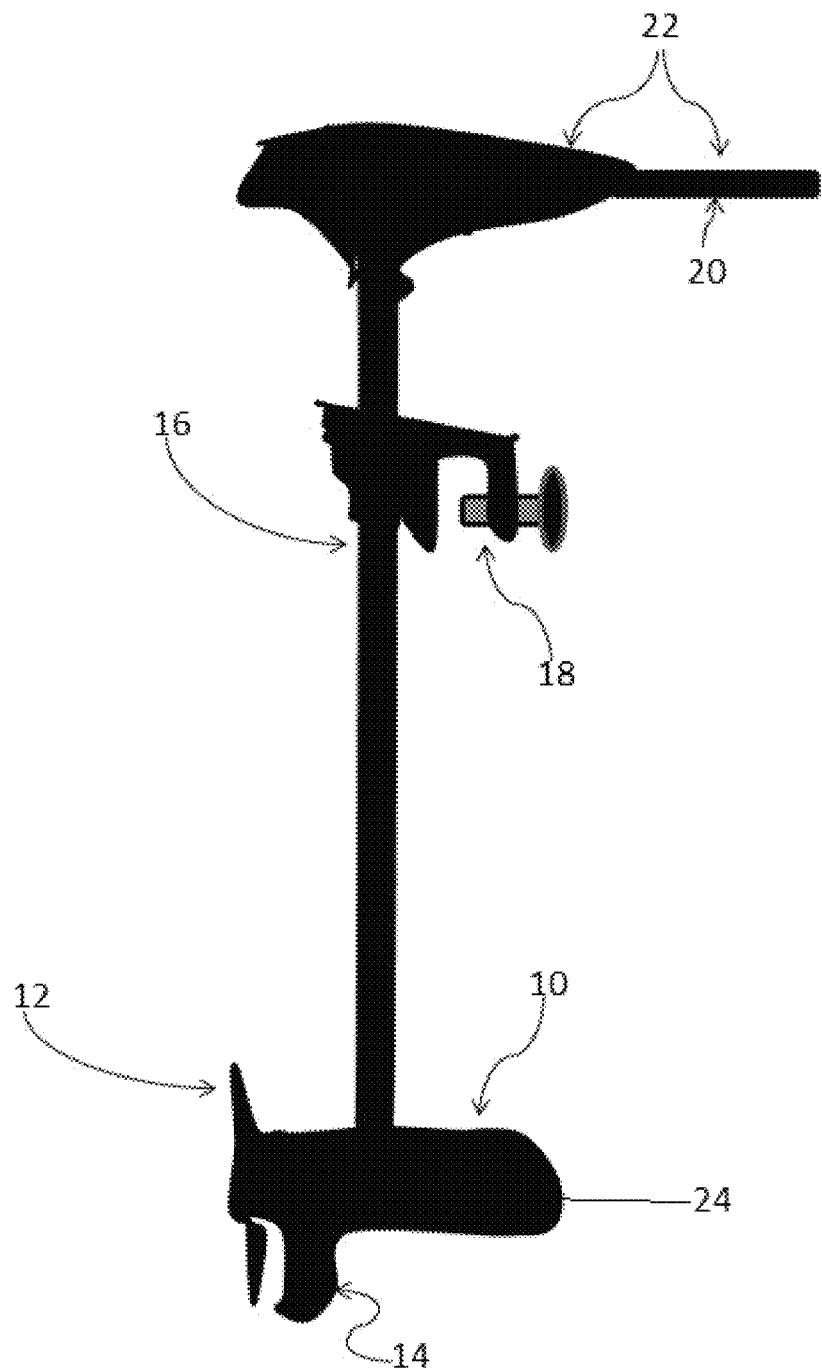
FIG. 1 is a prior art silhouette of a prior art clamp mounted trolling motor.
Figure 2A:
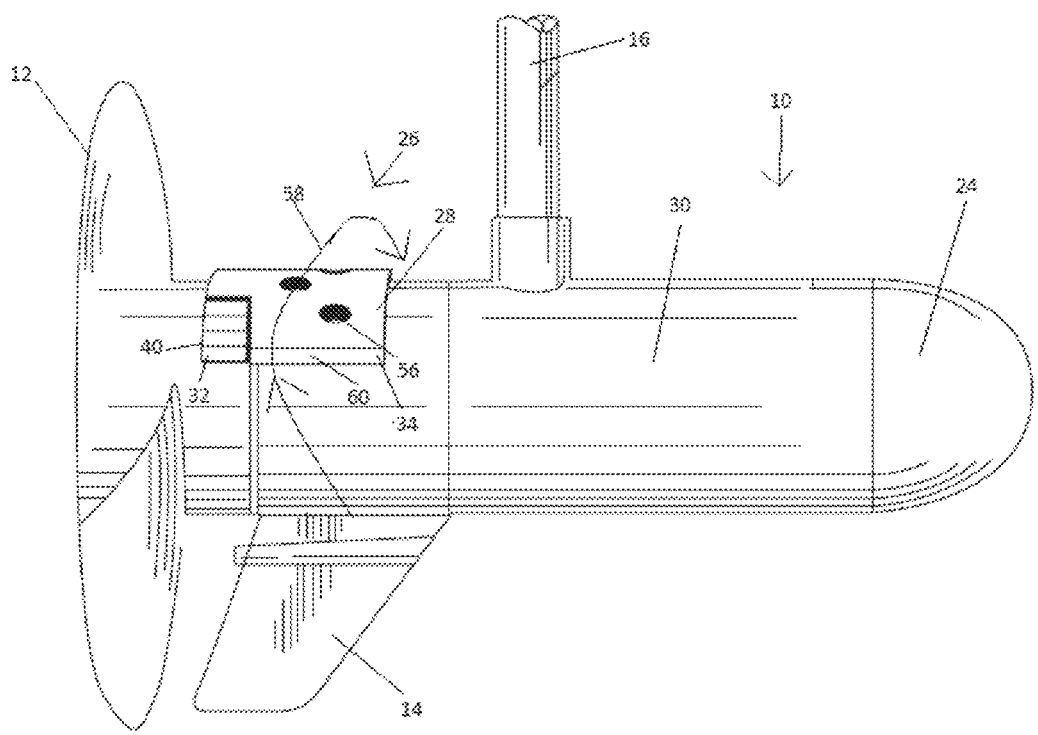
FIG. 2A is a partial side view of a trolling motor to which the vegetation cutter attachment of the present invention is affixed.
Figure 2B:
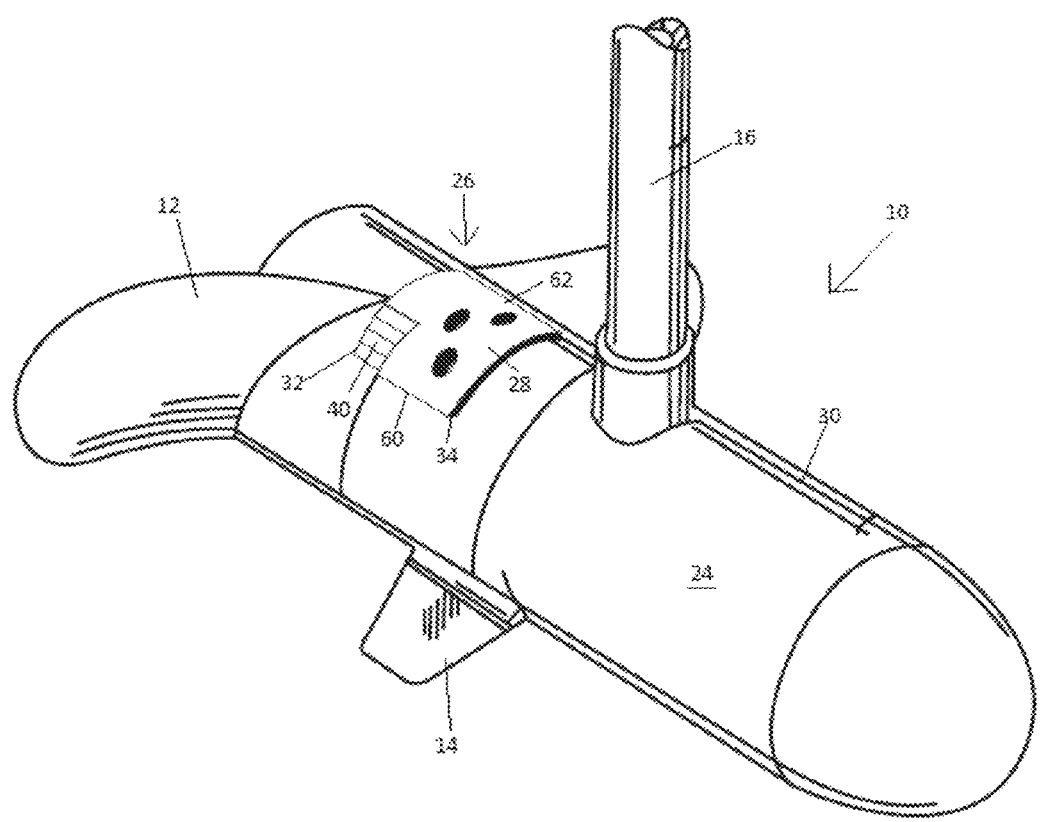
FIG. 2B is a partial perspective view of the trolling motor of FIG. 2A.

FIGS. 2A and 2B, focus on the lower portion of trolling motor 10, specifically the portion at the bottom of shaft 16 including motor housing 24, propeller 12, and skeg 14. It is understood that the remainder of trolling motor 10, including tiller 20 and clamp 18, as illustrated in FIG. 1, are also included in the trolling motor 10 of the present invention, but are not shown for the sake of clarity in focusing on the lower portion. It is further understood than any trolling motor 10 commonly known in the art may be used in connection with this invention.

Referring first to FIGS. 2A and 2B, side and perspective views of trolling motor 10 of the present invention are provided, respectively. The motor housing 24 of trolling motor 10 has a substantially cylindrical shape 30. Cutter attachment system 26 includes plate 28 having a bottom surface (shown as 46 in FIG. 3B) affixed to the top of motor housing 24 away from skeg 14 and between propeller 12 and shaft 16. This area often becomes wound with weeds, so it is the logical place for the plate 28. Although it is shown directly on top of motor housing 24, the preferred disposition is on the side substantially equidistant from the skeg 14 and the top of the motor housing 24, as is shown in FIG. 3C.

Figure 5A:
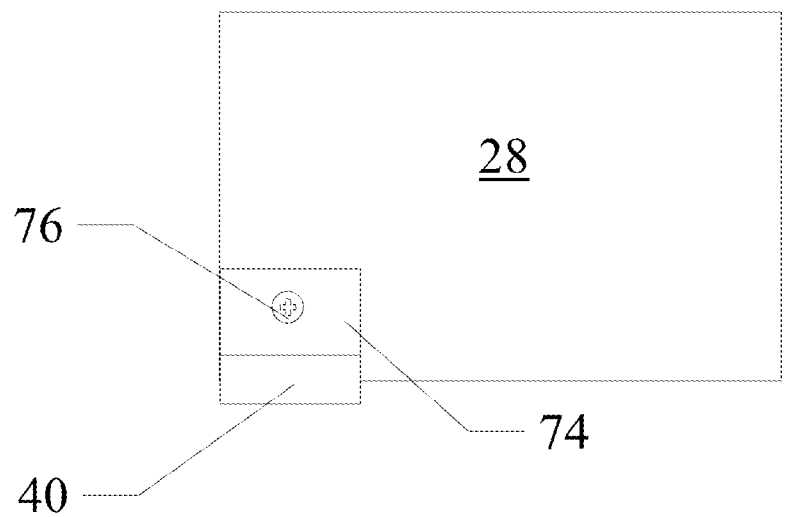
FIG. 5A is a top view of an alternative embodiment of the plate of the vegetation cutter attachment system of the present invention in which a removable blade is used as the cutting surface.
Figure 5B:
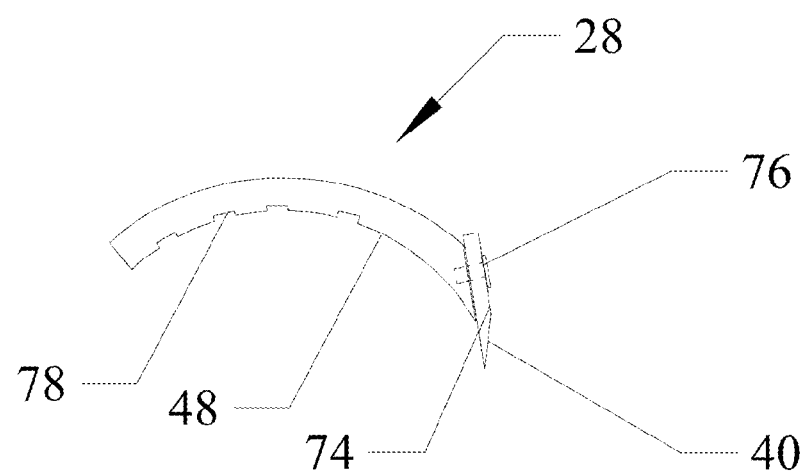
FIG. 5B is a side view of the plate of FIG. 5A

Plate 28 includes at least one corner, such as left propeller facing corner 32, which includes a cutting surface 40. The cutting surface 40 is preferably achieved by grinding the area between corner 32 and the inside end 33 of the cutting edge 42 down to form a sharp cutting edge 42, but any means of creating such a cutting edge 42 that is commonly used in the art may be substituted. Further, as shown in FIGS. 5A and 5B, the area between corner 32 and inside end 33 may be dimensioned as a holder for a replaceable removable blade having a cutting surface 40. The cutting surface 40 is positioned such that it extends beyond the back portion of the motor housing 24 such that it does not interfere with the propeller 12.

When trolling motor 10 is in operation, the movement of propeller 12 will create a spiral slipstream 58 that moves around motor housing 24 in the direction shown in FIG. 2A. The spiral slipstream 58 will move water and vegetation around motor housing 24 in this direction as well. The direction of the spiral slipstream 58 "engages" the left side 60 of plate 28, including left propeller facing corner 32. That is to say that the spiral slipstream 58 will move over that left side 60, including left propeller facing corner 32 from the bottom of the plate 28 to the top of the plate 28. On the right side 62 of the plate 28 (shown in FIG. 2B), the spiral slipstream 58 will "glide" over the right side 62 and its corners, meaning the spiral slipstream 58 will move over the side from the top of the plate 28 to the bottom of the plate 28. The engagement of spiral slipstream 58 with the left side 60 of plate 28, and especially left propeller facing corner 32, will bring vegetation, such as weeds, grass, and fishing line, across left side 60 and left propeller facing corner 32. When the vegetation moves across left propeller facing corner 32 with cutting surface 40, the vegetation will be cut before it has a chance to wind around the trolling motor 10.

Figure 4:
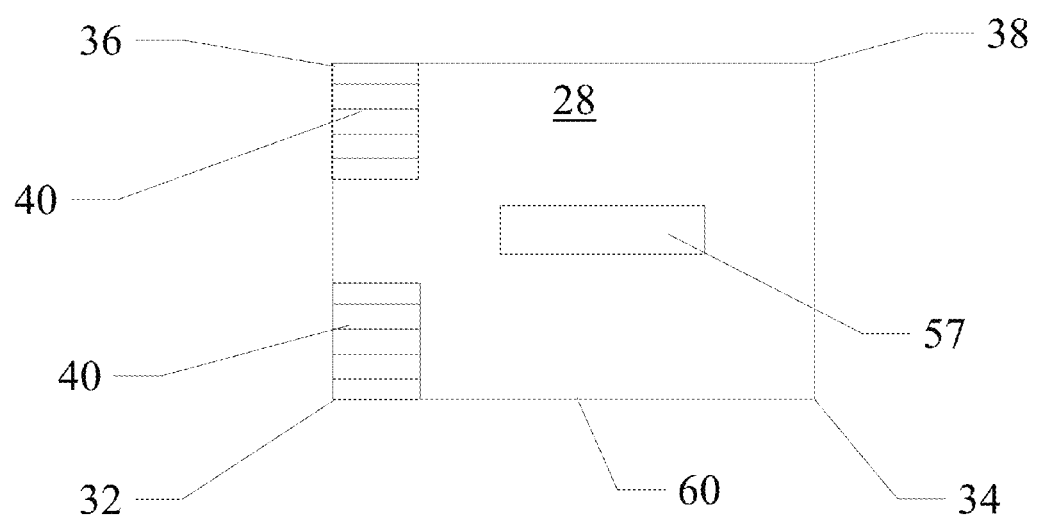
FIG. 4 is a top view of an alternative embodiment of the plate of the vegetation cutter attachment system of the present invention having two cutting surfaces.

It is understood that left and right sides and the direction of the spiral slipstream 58 are arbitrary. The direction of the spiral slipstream 58 will change depending on whether the propeller 12 is able to spin in both directions. The orientation shown herein is standard, but it is understood that if the propeller 12 spun in the other direction, then the direction of the spiral slipstream 58 would also be reversed. As shown in FIG. 4, in embodiments adapted for use with trolling motors 10 having reversible propellers 12, the opposite corner 36 may also include a cutting surface 40 to allow vegetation to be cut when the propeller moves in the opposite direction. However, as the propeller 12 itself will typically cut vegetation, this embodiment is not preferred.

The vegetation cutter attachment system 26 includes attachment means for attaching the plate 28 to the motor housing 24. These means may be any means commonly used in the art that would not compromise the operation of the trolling motor 10, specifically the motor being housed within the motor housing 24. Although watertight screws could be used, for example, for the reasons described above with regard to the Gremillion patent, it is preferred that the attachment means be epoxy (not shown), specifically A/B epoxy. As epoxy is the preferred attachment means, it is also preferred that plate 28 include at least one hole 56. Holes 56 allow the epoxy to flow through the plate 28 for better adhesion. The holes 56 are preferably multiple round holes 56, as shown in FIG. 3, but may be oblong shaped, such as the rectangular hole shown in FIG. 4, or any other desired shape. However, in some embodiments in which epoxy is the attachment means, the bottom surface 46 may include slots, such as sots 78 shown in FIG. 5B, grooves or other means for enhancing adhesion between the bottom surface 46 and the motor housing 24.

Figure 3A:
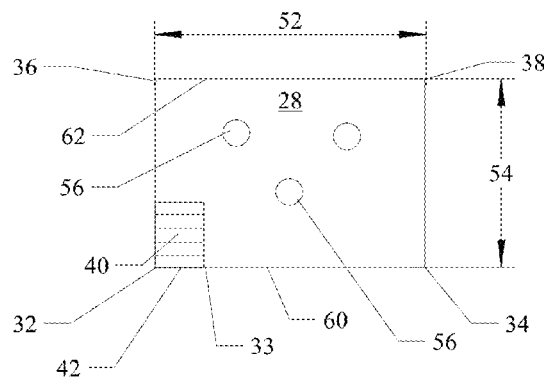
FIG. 3A is a top view of the preferred plate of the vegetation cutter attachment system of the present invention.
Figure 3B:
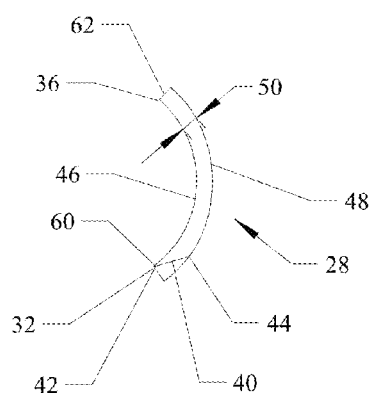
FIG. 3B is a side view of the plate of FIG. 3A.
Figure 3C:
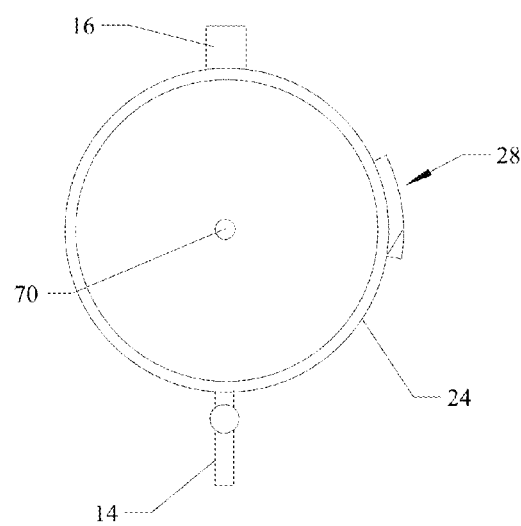
FIG. 3C is a rear view of the trolling motor of FIG. 3A with the propeller removed showing the vegetation cutter attachment affixed to the substantially cylindrical motor housing of the trolling motor.

Now referring to FIGS. 3A and 3B, the plate 28 is shown in top and side views respectively. Plate 28 preferably has a width 52 of between 2.25 and 2.75", preferably approximately 2.5"; a length 54 of between 1.5 and 2", preferably approximately 1.75"; and a height 50 of between $\frac{1}{16}$ and $\frac{3}{16}$", preferably $\frac{1}{8}$". Plate 28 includes left propeller facing corner 32, left shaft facing corner 34, right propeller facing corner 36, and right shaft facing corner 38. At least one corner, preferable left propeller facing corner 32, includes cutting surface 40, as described above. Plate 28 also includes bottom surface 46, which is flush to motor housing 24 when plate 28 is attached to motor housing 24, and top surface 48, which faces away from motor housing 24 when plate 28 is attached to motor housing 24. Cutting surface 40 is cut through height 50 on a slope from top surface 48 down to bottom surface 46, so that the thickest section 44 of cutting surface 40 is near or adjacent to top surface 48 and the cutting edge 42, which is the thinnest area of cutting surface 40, is near or adjacent to bottom surface 46. The plate is curved and contoured to conform to the shape of the motor housing. All motor housings are cylindrical, so the preferred plate for use with a standard motor housing is also rounded for flush affixation of the plate to the round motor housing. The preferred plate 28 is rectangular when flattened meaning that, were the curve eliminated, the plate 28 would be form a rectangular prism. However, the plate may take other shapes.

The plate 28 is preferably made of aluminum, which is preferred due to the fact that it is non-magnetic and will not interfere with the operation of the motor, as well as its corrosion resistance. However, the plate 28 may be made from other materials, such as plastics or composites, which provide similar properties. Further, although not preferred, ferrous metals, such as steels, may be used provided the motor housing 24 provides adequate magnetic shielding to avoid interference with the operation of the motor 10.

Referring now to FIGS. 5A and 5B, in some embodiments of the invention, the plate 28 includes a removable blade 74 having a cutting surface 40. As shown in FIGS. 5A and 5B, the blade 74 may be attached via a screw 76 that mates with a tapped opening (not shown) in the plate 28. However, other embodiments may utilize clamps or other art recognized means for attaching a blade to a holder.

Figure 6:
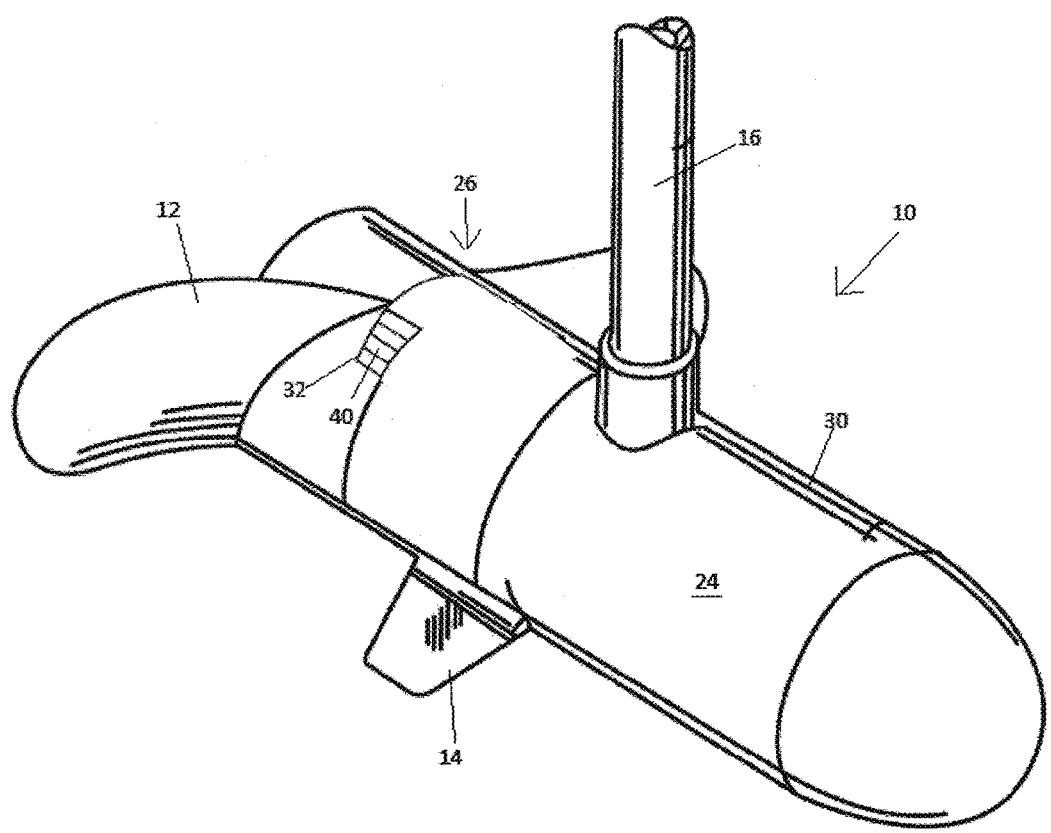
FIG. 6 is a perspective view of an embodiment of the trolling motor of the present invention in which the cutting surface is formed as part of the motor housing.

FIG. 6 shows one embodiment of the trolling motor 10 in which the cutting surface 40 is formed integral to the motor housing 24. In such embodiments, the plate 28 is eliminated and the cutting surface 40 is formed during the manufacturing process. Alternatively, the motor housing 24 may be adapted to accept a removable blade, such as the blade 74 shown in FIGS. 5A and 5B.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A vegetation cutter attachment system for a trolling motor comprising a motor housing having a substantially cylindrical back portion, a motor, a propeller extending from the back portion of the motor housing, a skeg extending down from the motor housing, and a shaft extending upward from the motor housing, said vegetation cutter attachment system comprising:
    a vegetation cutter attachment comprising a substantially curved plate with four corners, wherein said plate comprises a curved bottom surface that is formed to contour to the cylindrical back portion of the motor housing and wherein at least one of said four corners comprises at least one cutting surface; and
    attachment means for attaching said curved bottom surface of said plate to the cylindrical back portion of the motor housing of the trolling motor.

2. The vegetation cutter attachment system as claimed in claim 1, wherein said plate comprises a left side comprising a left propeller facing corner and a left shaft facing corner and a right side comprising a right propeller facing corner and a right shaft facing corner, wherein said left propeller facing corner, said left shaft facing corner, said right propeller facing corner, and said right shaft facing corner are said four corners of said plate, and wherein at least said left propeller facing corner comprises said cutting surface.

3. The vegetation cutter attachment system as claimed in claim 2, wherein a second cutting surface is disposed upon said right propeller facing corner.

4. The vegetation cutter attachment system as claimed in claim 1, wherein said plate is rectangular when flattened, and comprises the following dimensions:
    between 1/16" and 3/16" thick;
    between 2.25" and 2.75" wide; and
    between 1.5" to 2" long.

5. The vegetation cutter attachment system as claimed in claim 1, wherein:
    said attachment means comprises epoxy for adhering said curved bottom surface of said plate to the cylindrical back portion of the motor housing of the trolling motor; and
    said plate further comprises at least one hole through which said epoxy is capable of flowing for better adhesion.

6. The vegetation cutter attachment system as claimed in claim 1, wherein:
    said attachment means comprises epoxy for adhering said curved bottom surface of said plate to the cylindrical back portion of the motor housing of the trolling motor; and
    said bottom surface of said plate further comprises at least one slot into which said epoxy is capable of flowing for better adhesion.

7. The vegetation cutter attachment system as claimed in claim 1, wherein:
    said plate comprises a height and said at least one cutting surface in said at least one corner slopes downward through said height such that said cutting surface is thickest proximate to said top surface and thinnest proximate to said bottom surface.

8. The vegetation cutter attachment system as claimed in claim 1, wherein said plate is manufactured from a group consisting of aluminum, plastic and composite materials.

9. The vegetation cutter attachment system as claimed in claim 1 further comprising a removable blade attached to said plate, wherein said cutting surface is disposed upon said removable blade.

10. A trolling motor comprising at least:
    a motor housing, said motor housing comprising a substantially cylindrical back portion;
    a shaft extending upward from said motor housing;
    a motor disposed within said motor housing, said motor comprising a rotatable propeller shaft;
    a propeller attached to said rotatable propeller shaft and extending from said cylindrical back portion of said motor housing;
    a skeg extending down from said cylindrical back portion of said motor housing;
    a vegetation cutter attachment for cutting vegetation from said propeller, said vegetation cutter attachment comprising a substantially curved plate with four corners, wherein said plate comprises a curved bottom surface that is formed to contour to the cylindrical back portion of the motor housing and wherein at least one of said four corners comprises at least one cutting surface;
    wherein said curved bottom surface of said plate is attached to the cylindrical back portion of the motor housing of the trolling motor proximate to said propeller such that said at least one cutting surface is exposed and positioned to cut said vegetation from said propeller.

11. The trolling motor as claimed in claim 10 further comprising a removable blade attached to said plate, wherein said cutting surface is disposed upon said removable blade.

12. The trolling motor as claimed in claim 10, wherein said plate of said vegetation cutter attachment is rectangular when flattened, and comprises the following dimensions:
    between 1/16" and 3/16" thick;
    between 2.25" and 2.75" wide; and
    between 1.5" to 2" long.

13. The trolling motor as claimed in claim 10, further comprising a layer of epoxy disposed between and affixing said curved bottom surface of said plate and said cylindrical back portion of the motor housing of the trolling motor.

14. The trolling motor as claimed in claim 13, wherein said plate of said attachment further comprises at least one hole and epoxy disposed with each of said at least one hole.

15. The trolling motor as claimed in claim 13, wherein said bottom surface of said plate further comprises at least one slot into which said epoxy disposed.

16. The trolling motor as claimed in claim 10, wherein said plate of said vegetation cutter attachment comprises a left side comprising a left propeller facing corner and a left shaft facing corner and a right side comprising a right propeller facing corner and a right shaft facing corner, wherein said left propeller facing corner, said left shaft facing corner, said right propeller facing corner, and said right shaft facing corner are said four corners of said plate, and wherein at least said left propeller facing corner comprises said cutting surface.

17. The trolling motor as claimed in claim 16, wherein said right propeller facing corner comprises a second cutting surface.

18. The trolling motor as claimed in claim 10, wherein said plate is manufactured from a group consisting of aluminum, plastic and composite materials.

19. A trolling motor comprising at least:
   a motor housing, said motor housing comprising a substantially cylindrical back portion;
   a shaft extending upward from said motor housing;
   a motor disposed within said motor housing, said motor comprising a rotatable propeller shaft;
   a propeller attached to said rotatable propeller shaft and extending from said cylindrical back portion of said motor housing;
   a skeg extending down from said cylindrical back portion of said motor housing;
   a vegetation cutter formed integral to the cylindrical back portion of the motor housing, said vegetation cutter comprising at least one cutting surface disposed proximate to said propeller such that said at least one cutting surface is exposed and positioned to cut said vegetation from said propeller.

20. The trolling motor as claimed in claim 19, wherein said vegetation cutter further comprises a removable blade attached to said motor housing, wherein said cutting surface is disposed upon said removable blade.

\* \* \* \* \*